H. HENDRICKSON.
COMB.
APPLICATION FILED JUNE 21, 1921.

1,409,855.

Patented Mar. 14, 1922.

Henry Hendrickson
INVENTOR

BY Victor J. Evans
ATTORNEY

WITNESS:
C. Nye Fraser Jr.

UNITED STATES PATENT OFFICE.

HENRY HENDRICKSON, OF STEPHEN, MINNESOTA.

COMB.

1,409,855.

Specification of Letters Patent.  Patented Mar. 14, 1922.

Application filed June 21, 1921. Serial No. 479,257.

*To all whom it may concern:*

Be it known that I, HENRY HENDRICKSON, a citizen of the United States, residing at Stephen, in the county of Marshall and State of Minnesota, have invented new and useful Improvements in Combs, of which the following is a specification.

This invention relates to curry combs and has for its object the provision of a novel device of this character which is so constructed that at the end of each stroke the head thereof will be caused to snap against the handle with appreciable impact whereby to produce a jar or shock which will cause the dust to be shaken off so that the device will be continuously and automatically cleaned and be consequently more efficient in its action.

An important object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1:
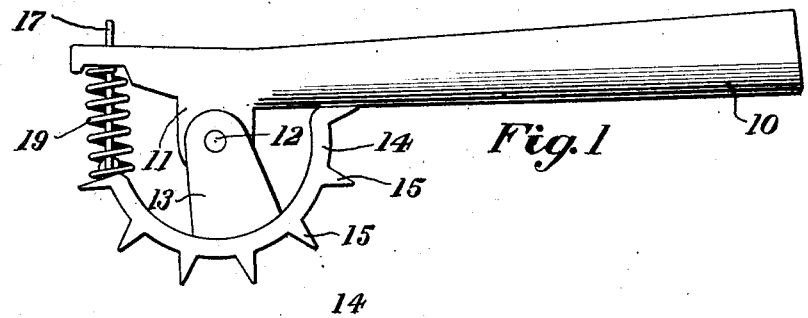
Figure 1 is a side elevation of my device.
Figure 2:
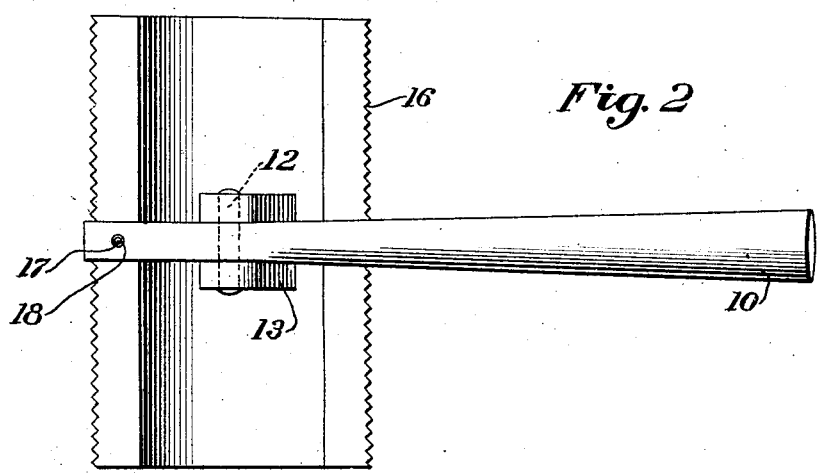
Figure 2 is a plan view looking at the back thereof.
Figure 3:
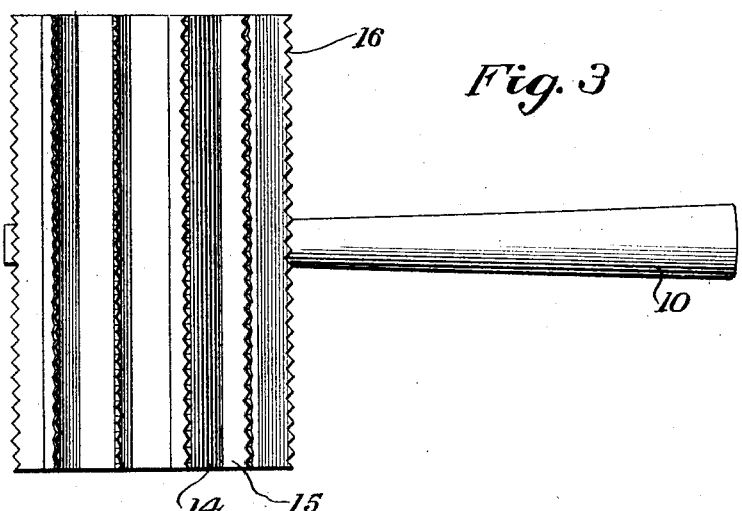
Figure 3 is a view looking at the front thereof.

Referring more particularly to the drawings, I have shown my device as comprising an elongated handle 10 which is formed at one side with an ear 11 upon which is pivotally engaged, as shown at 12, spaced ears 13 formed on the comb proper which is formed as a curved head 14 provided with a plurality of parallel ribs 15 notched to provide teeth 16.

Pivotally connected with the forward edge of the head 14 is a guide rod 17 passing slidably through a hole 18 in the end of the handle and surrounded by a coil spring 19 which abuts against the underside of the handle and against the forward edge of the head 14. This spring 19 operates to hold the head normally in position with its rear edge engaging against the underside of the handle rearwardly of the ear 11 thereon.

In the use of the device it will be seen that when the operator engages the comb proper upon the animal to be curried and takes a stroke, the frictional pressure upon the comb proper will cause the comb to be rocked upon its pivot 12 and this will cause partial compression of the spring 19 and movement of the rear edge of the head away from the handle. At the completion of a stroke, that is when the comb proper is removed from in engagement with the hide of the animal, the spring 19 will expand and rock the comb upon its pivot 12 which will result in forcible engagement of the rear edge of the comb with the handle and this will cause a shock or jar which will result in shaking out the dust and hair accumulated upon the teeth. In this way it will be seen that the device is automatically self cleaning so that it will always be in proper condition ready for use.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, I claim:

1. A curry comb comprising a handle, a head pivoted thereon and provided with a plurality of ribs notched to define teeth, and a spring engaging the head and the handle whereby to urge one edge of the head normally into engagement with the handle.

2. A curry comb comprising a handle formed with a laterally projecting ear spaced from the ends thereof, a curved head carrying ears pivoted upon said first named ear, the head being formed with a plurality of serrated ribs, a guide rod connected with the forward edge of the head and slidable through the adjacent end of the handle, and a spring surrounding said rod and engaging against the adjacent edge of the head and against the handle whereby to urge the rear edge of the head into engagement with the handle.

3. A curry comb comprising a handle, a head pivoted thereon and formed with teeth, and means engaging said head for normally holding one edge thereof against the handle and for returning said edge against the handle after a stroke of the head upon the hide of an animal.

4. A curry comb comprising a handle, a curved head pivoted thereon, and spring means engaging the head for normally holding one edge thereof against the handle and for returning said edge against the handle after the successive strokes of the head against the hide of an animal.

5. A curry comb comprising a handle and a convex toothed spring pressed head carried thereby and normally having one edge engaging against the handle.

In testimony whereof I affix my signature.

HENRY HENDRICKSON.